(12) United States Patent
Hueger et al.

(10) Patent No.: US 9,590,809 B2
(45) Date of Patent: Mar. 7, 2017

(54) METHOD FOR OPERATING A MOBILE DEVICE BY MEANS OF A MOTOR VEHICLE

(71) Applicant: Volkswagen Aktiengesellschaft, Wolfsburg (DE)

(72) Inventors: Fabian Hueger, Braunschweig (DE); Helge Neuner, Wolfenbuettel (DE); Michael Mirtschink, Berlin (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 64 days.

(21) Appl. No.: 14/162,109

(22) Filed: Jan. 23, 2014

(65) Prior Publication Data
US 2014/0136849 A1    May 15, 2014

Related U.S. Application Data

(63) Continuation of application No. PCT/EP2012/002678, filed on Jun. 26, 2012.

(30) Foreign Application Priority Data

Jul. 23, 2011  (DE) .......... 10 2011 108 466
Oct. 15, 2011  (DE) .......... 10 2011 116 131

(51) Int. Cl.
| | | |
|---|---|---|
| *H04L 29/00* | (2006.01) |
| *H04L 9/32* | (2006.01) |
| *G06F 21/33* | (2013.01) |
| *B60K 37/06* | (2006.01) |
| *H04L 29/06* | (2006.01) |
| *G06F 3/00* | (2006.01) |

(52) U.S. Cl.
CPC ............ *H04L 9/3263* (2013.01); *B60K 37/06* (2013.01); *G06F 3/00* (2013.01); *G06F 21/33* (2013.01); *H04L 63/0823* (2013.01); *B60K 2350/357* (2013.01)

(58) Field of Classification Search
CPC .......... H04L 9/326; H04L 63/08; G06F 21/33
USPC ......... 713/155–159, 168–177; 726/2–10, 21, 726/26–30
See application file for complete search history.

(56) References Cited

U.S. PATENT DOCUMENTS

| | | | |
|---|---|---|---|
| 7,366,892 B2 * | 4/2008 | Spaur et al. .................. | 713/151 |
| 8,707,044 B2 * | 4/2014 | Shim et al. .................... | 713/171 |
| 2010/0037057 A1 * | 2/2010 | Shim ................... | H04L 63/0823 |
| | | | 713/171 |

(Continued)

FOREIGN PATENT DOCUMENTS

WO    WO 2004/068424 A2    8/2004

*Primary Examiner* — Madhuri Herzog
(74) *Attorney, Agent, or Firm* — Barnes & Thornburg LLP

(57) ABSTRACT

A method for operating a mobile device, not assigned to a motor vehicle, via an electronic device with a display and operator control device of the motor vehicle is made available. The program has program parts for a user interface and for operator control sequences which are assigned a digital certificate. The user interface comprises fixed areas for displaying variable contents. The program parts are transmitted together with the digital certificate to the electronic device of the motor vehicle and are carried out when the certificate is successfully checked. The transmission of data without protection by a digital certificate is restricted to the variable contents for display in the fixed areas of the user interface.

16 Claims, 3 Drawing Sheets

(56) References Cited

U.S. PATENT DOCUMENTS

2011/0185390 A1\* 7/2011 Faenger et al. ................ 725/75
2011/0246891 A1 10/2011 Schubert et al.
2012/0151214 A1 6/2012 Putze
2015/0262439 A1\* 9/2015 Kleve ................... H04L 9/3215
　　　　　　　　　　　　　　　　　　　　　　　340/5.61

\* cited by examiner

METHOD FOR OPERATING A MOBILE DEVICE BY MEANS OF A MOTOR VEHICLE

This nonprovisional application is a continuation of International Application No. PCT/EP2012/002678, which was filed on Jun. 26, 2012, and which claims priority to German Patent Application No. DE 10 2011 108 466.9, which was filed in Germany on Jul. 23, 2011 and German Patent Application No. DE 10 2011 116 131.0, which was filed in Germany on Oct. 15, 2011, and which are all herein incorporated by reference.

BACKGROUND OF THE INVENTION

Field of the Invention

The present application relates to a method for displaying information and operating a mobile device, not directly assigned to a motor vehicle, via an electronic unit with a display and operating device of a motor vehicle.

Description of the Background Art

The connection of a mobile device, for instance, a mobile telephone or a portable MP3 player, to electronic devices of the motor vehicle is known in the conventional art. Thus, mobile telephones can be connected to a speaker phone in the vehicle; mobile MP3 players can be connected to play back music stored in the mobile device on the vehicle's audio system. Such connections can be realized, for example, wirelessly by means of Bluetooth. It is likewise known to provide control elements for operating the mobile devices, e.g., for accepting an incoming call or for regulating the playback volume. These control elements can be located, for example, on the center console or on a steering wheel of a vehicle.

Furthermore, the connection of mobile devices, e.g., smartphones or PDAs, to a display and operating device of a motor vehicle in the so-called "terminal mode" is known from the state of the art (industry standard "Terminal Mode Technical Architecture," Release Version 1.0, www.terminalmode.org). Many programs, often called "apps," can be executed on mobile devices of the aforementioned type. If the mobile device in the terminal mode is coupled to the operating and display device of the motor vehicle, the program itself is executed further on the mobile device. The displaying, however, occurs by means of the display device of the motor vehicle and the operation of the program occurs by means of the operating device of the motor vehicle. Suitable data transmission techniques such as, e.g., USB, WLAN, or Bluetooth are used to transmit the display contents from the motor vehicle to the mobile device and to transmit the commands generated by the operating device from the motor vehicle to the mobile device.

It is known furthermore to tag the execution of programs, which are not suitable for execution and for display in the terminal mode during the drive, because they could distract the vehicle driver, with an appropriate attribute and to prevent the displaying of these programs in the terminal mode while driving.

U.S. Publication 20120151214, which is incorporated herein by reference, discloses a method in which the execution of a program in the terminal mode is subject to the successful verification of a digital certificate associated with the program, whereby the method comprises the following steps: Storing a program executable on a mobile device and a digital certificate associated with the program in the mobile device; Transmitting the digital certificate from the mobile device to a motor vehicle; Verifying the digital certificate in the motor vehicle; In the event of the successful verification of the digital certificate: presenting the information associated with the program, executable on the mobile device, by means of a display of the motor vehicle; and Using the program executable on the mobile device by means of a user arrangement, associated with the display, in the motor vehicle. In an embodiment, the certificate is issued by a certification server. The operator of said server certifies by the digital signing of the certificate that the program is suitable for execution in the terminal mode.

In the method described in U.S. 20120151214, the display and operation of the program, executable on the mobile device, by means of the display and operating device of the motor vehicle in the terminal mode are permitted after successful verification of the digital certificate associated with the program. It is assured in this way that only certified programs can be executed.

However, in the conventional art there is, however, the possibility of the improper use of a display and operating device of the motor vehicle in that, following the successful verification of a program associated with a certified program, a non-certified program passes itself off as this program to the display and operating device. If the non-certified program prevents the data transmission of the certified program to the display and operating device, then there is no possibility of detecting the improper use of the display and operating device. It is also conceivable that the non-certified program is executed on the same mobile device as the certified program, as well as that the non-certified program is executed on a second mobile device, which is in the communication path between the first mobile device and the display and operating device of the vehicle, whereby the second mobile device prevents the direct communication between the first mobile device and the display and operating device of the vehicle and passes itself off during the communication with the first mobile device as the display and operating device of the vehicle and vice versa (so-called "man-in-the-middle" attack).

SUMMARY OF THE INVENTION

It is therefore an object or the present invention to develop a method for displaying information and/or operating a mobile device, not directly assigned to a motor vehicle, by means of an electronic unit with a display and operating unit of a motor vehicle, which allows improved control of the displaying and/or operating of the program.

According to an embodiment of the invention, the program executable on the mobile device comprises program parts for a user interface and for operating processes of the program. The commonly used term "graphical user interface" (GUI) will be used hereafter for the totality of user interface and operating processes. During operation of the program by means of the electronic unit with the display and operating device of the vehicle, the mobile device is connected to the electronic unit of the vehicle (e.g., in the above-described terminal mode). The presentation of the user interface of the GUI thus occurs by means of the display unit of the vehicle and the control of the operating processes of the GUI occurs by means of the operating unit of the vehicle.

It is provided further according to an embodiment of the invention that the digital certificate can be assigned to the GUI. The program parts for the user interface and for the operating processes with the associated certificate are transmitted from the mobile device to the electronic unit of the vehicle. The certificate is verified in the electronic unit of the vehicle. If the verification is successful, the program parts for the user interface and for the operating processes of the program are executed in the electronic unit. The user interface is now displayed on the display device of the vehicle and can be controlled via the operating device of the vehicle.

According to an embodiment of the invention, fixed areas for displaying variable contents can be provided in the user interface. Variable contents, which are not identified as trusted by an associated digital certificate, can be shown to a limited extent in this way in the user interface. The above-described danger of an improper use of the display device of the motor vehicle, for instance, by the mentioned man-in-the-middle attack, is therefore limited to the display of information in the fixed area of the user interface.

In an embodiment of the invention, the digital certificate can be issued by a certification server. The assignment of the certificate to the program parts for the user interface and for the operating processes is also made by means of the certification server.

The certification server can use asymmetric signing methods for the certification of the GUI, i.e., for issuing the digital certificate and assigning the digital certificate to the GUI; these are, for example, methods that use a private key for signing the contents and a public key matching the private key for verifying the signature. For this purpose, the server has one or more key pairs, whereby in each case the public key of each key pair is stored in the electronic unit of the vehicle or is transmitted over a secure data connection from the certification server or from some other trusted source to the electronic unit of the vehicle. A trusted source in this connection is characterized in that it was identified as trusted by means of a certificate by a server, already known as trusted to the electronic unit of the vehicle. In this way, it is possible, for example, that the certification server issues to another server a digital certificate, with which said server can identify itself as trusted to the electronic unit of the vehicle.

The certificate can include, inter alia, a digital fingerprint (a so-called hash value), which is created by the certification server by means of the private key of the employed key pair from the GUI. The method can provide the creation of the certificate in accordance with the ITU-T standard X.509.

The program executable on the mobile device and the certificate assigned to the GUI can be sent from the certification server to the mobile device. The transmission can occur, for example, over the Internet. Other types of transmission are conceivable.

In a further embodiment of the invention, the variable contents, for the display of which the fixed areas of the GUI are provided, are transmitted from the mobile device to the electronic unit of the vehicle. Such contents can both be created by the program, executed on the mobile device, during runtime and be present in data form in the mobile device. In a further embodiment, the electronic unit is connected to a data bus system of the vehicle and obtains data from said data bus system, which are suitable for display as variable contents either directly or after suitable conversion, processing, or formatting by the electronic unit.

The method can comprise an additional step in which the data obtained from the at least one bus system of the vehicle are first sent from the electronic unit of the vehicle to the mobile device. They are processed there and then again sent to the electronic unit in processed form. The vehicle data that the electronic unit obtains from the vehicle data bus system and may transmit to the mobile device are established in the program parts for the user interface and for the operating processes of the program. This data access is thus authorized by the trusted certification server and protected from improper use.

In a further embodiment of the invention, the method comprises the transmission of at least one command generated by the operating unit to the mobile device. Preferably, the program executable on the mobile device is controlled as a function of this at least one command.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Exemplary embodiments of the invention will be described in detail below with reference to the accompanying drawings. It should be noted that these exemplary embodiments serve only as an example and are not to be construed as limiting. In particular, the description of an exemplary embodiment with a plurality of features is not to be construed to the effect that all these features are necessary for carrying out the invention, because other exemplary embodiments may have fewer features and/or alternative features. It should be noted moreover that features of different exemplary embodiments can be combined, unless indicated otherwise.

Figure 1:
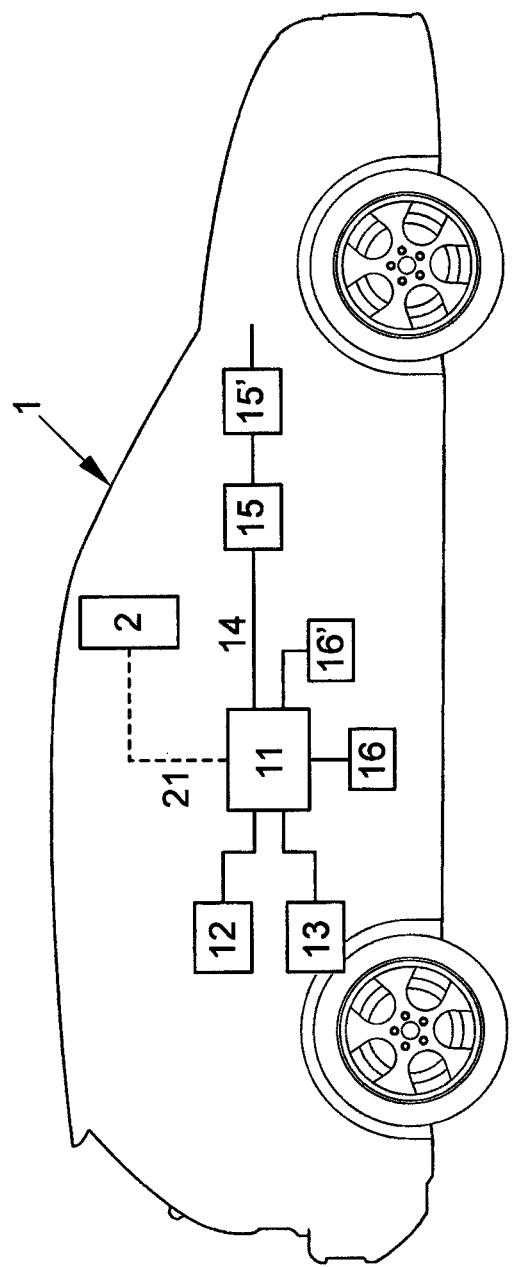
FIG. 1 illustrates an exemplary embodiment of a motor vehicle in a schematic diagram.

A motor vehicle 1 suitable for realizing the method of the invention is shown in FIG. 1. The motor vehicle comprises an electronic unit 11 with a display device 12 and an operating device 13. Further, the presence of a mobile device 2 is shown, which is not assigned to motor vehicle 1. This means that mobile device 2 is not part of motor vehicle 1. Mobile device 2 is connected to electronic unit 11 over a suitable data connection 21. Such a data connection can be made, for example, wireless, e.g., as a Bluetooth connection, or hard-wired, for instance, as a USB connection. In the schematic diagram of FIG. 1, electronic unit 11 comprises a plurality of function blocks realizable in a motor vehicle also by separate, but interconnected devices, units, and apparatus. Thus, electronic unit 11 of one or more control devices for controlling the display and operating device may comprise and/or combine one or more devices for data exchange with one or more mobile devices connected to the vehicle, one or more devices for data communication with at least one further device 15, 15' of the motor vehicle by means of at least one data bus system 14, 14' of the motor vehicle, and other devices and control devices 16, 16', e.g., navigation devices, audio system, infotainment systems.

Figure 2:
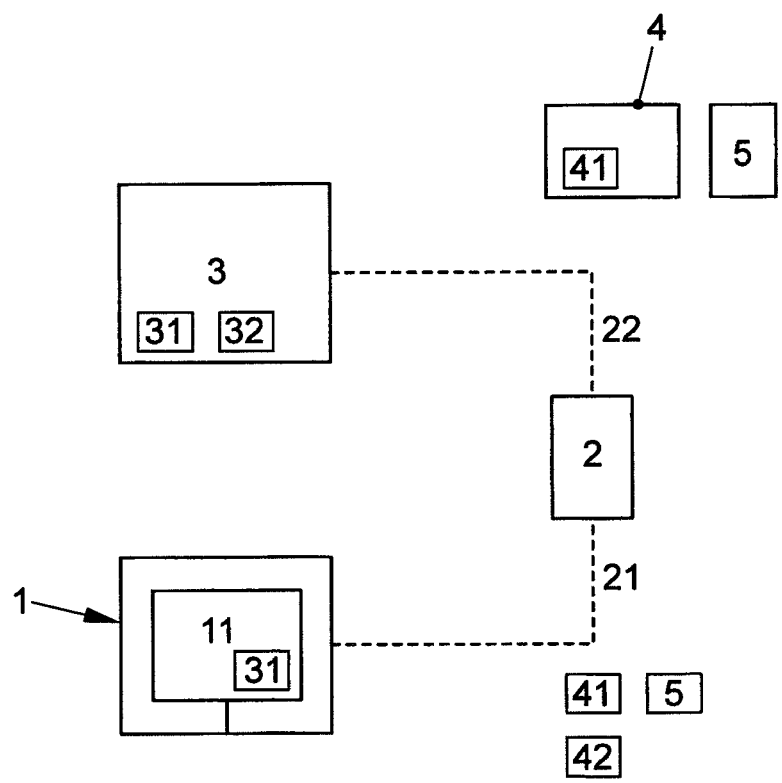
FIG. 2 illustrates an exemplary embodiment for a data exchange between a certification server, a mobile device, and an electronic unit in a motor vehicle.

FIG. 2 shows by way of example the data transmission, which proceeds according to the method of the invention in an advantageous manner between certification server 3, mobile device 2, and the electronic unit of motor vehicle 11.

In the shown exemplary embodiment, certification server 3 sends program 4, executable on the mobile device and comprising program parts for the user interface and for the operating processes of the program (GUI) 41, together with digital certificate 5 to the mobile device. Such a transmission can occur, for example, over broadband wireless Internet connections (UMTS, LTE) 22.

Digital certificate 5 can comprise the following information inter alia:
  The name or some other explicit descriptor of the issuer;
  Information on the rules and methods under which certificate 5 was issued;
  Information on the validity period of certificate 5;
  Public key 31 for which certificate 5 provides information;
  The name (or some other explicit descriptor) of the owner of public key 31;
  Further information on the owner of public key 31;
  Particulars on the permissible application range and validity period of public key 31;
  A digital signature of the issuer for the program parts for the user interface and for the operating processes of the program (GUI) 41;
  A digital signature of the issuer for all other information.

The digital signature, with which certificate 5 is explicitly assigned to the GUI, can be created by the direct use of private key 32 of certification server 3 to the program parts for the user interface and for operating processes 41. In the electronic unit of the motor vehicle 11, public key 31, matching private key 32, of certification server 3 can be applied to the digital signature and thus the authenticity of the transmitted program parts for the user interface and for operating processes 41 can be verified. It is more advantageous, however, to first calculate a digital fingerprint (hash value) from program parts 41. This identifies program parts 41 in an unambiguous manner (i.e., two different messages produce two different hash values with a probability bordering on certainty), but has a clearly smaller data volume (e.g., 160 bits). The digital signature is then created by applying private key 32 of certification server 3 to the hash value. Because of the noted unambiguous assignment of the hash value to program parts 41, it is assured that certificate 5 is assigned to GUI 41.

Mobile device 2 transmits the program parts for the user interface and for the operating processes of program 41 together with digital certificate 5 over data connection 21 to electronic unit 11 of vehicle 1. There, the hash value of program parts 41 is obtained by means of the already noted application of public key 31 to the digital signature. Further, the hash value is calculated from transmitted program parts 41 in electronic unit 11. If both hash values agree, the verification is concluded successfully and program parts 41 are executed. As soon as program parts 41 are executed, data and contents can be exchanged over data connection 21.

Figure 3:
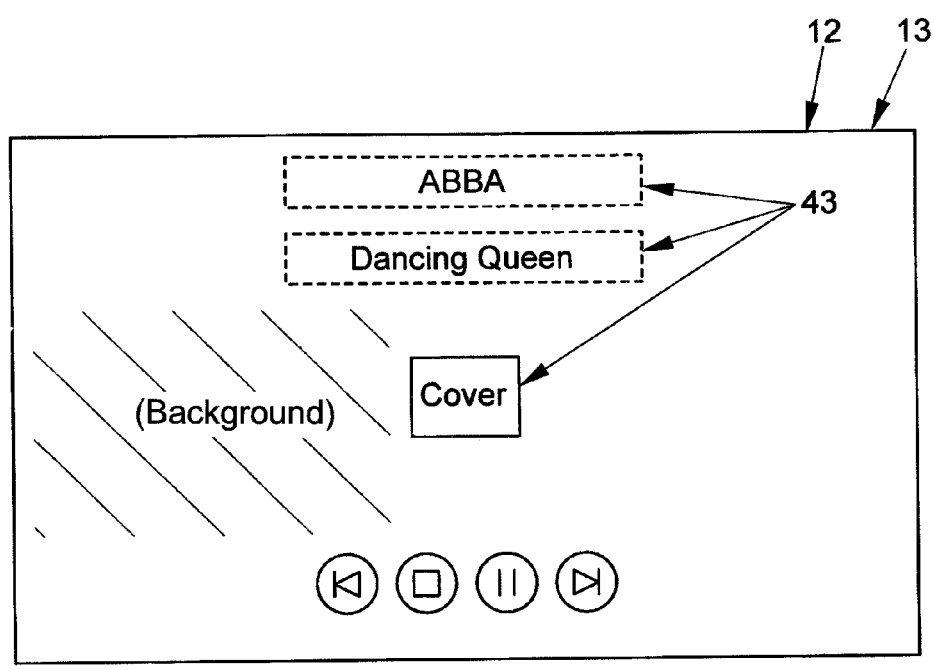
FIG. 3 is an exemplary illustration of a user interface via the display device of the motor vehicle.

The execution of a program 4 according to the claimed method starting at the time of the successful verification of the certificate will be explained in greater detail hereafter by using the example of a MP3 playback program. To this end, FIG. 3 shows an exemplary illustration of a user interface by means of display device 12 of motor vehicle 13. In the shown example, the display device is a touch screen, therefore a touch-sensitive display area. Thus, FIG. 3 shows at the same time operating device 13 of motor vehicle 1. It should be noted that this embodiment of operating device 13 is to be understood only by way of example. The described method is also suitable for other embodiments of operating device 13. In particular, the operation can also occur by means of push/turn buttons and/or pushbuttons. The shown user interface is unchangeable with the exception of fixed areas 43 for displaying variable contents. Areas 43 comprise a text field for outputting the artist of the current MP3 file, a text field for outputting the title, an area for displaying the album cover art as a graphic, and the background which is to be variable solely in its color. Furthermore, operating elements are shown by means of which the user can control the program (previous title, stop, pause, next title).

The currently selected title is transmitted together with the contents "artist," "title," "album cover art," and "background color" from mobile device 2 over data connection 21 to electronic unit 11. The audio information is transmitted from electronic unit 11 to audio output device 16 of vehicle 1. The artist, title, album cover art, and background color are shown on display 12. If the user issues a command via the operating device, for example, by tapping the "next title" button on the touch screen, this command is transmitted to mobile device 2 over data connection 21. There, the next title is selected and transmitted as described with the associated contents to electronic unit 11.

In the shown example, it should be provided furthermore that the background color of the display is changed as a function of the ambient brightness. It is conceivable that mobile device 2 has a light sensor; in this case, the background color can be readily determined and transmitted to electronic unit 11. In a further example, the motor vehicle has a light sensor 15, which transmits its current measured values over data bus 14. Electronic unit 11 receives the specific current measured value over data bus 14 and transmits it over data connection 21 to the mobile device. There, by means of the current measured value a suitable background color is determined and transmitted as described for displaying to electronic unit 11. Other examples of data that can be obtained from data bus system 14 and either can be displayed directly or first can be transmitted for further processing to mobile device 2 comprise depending on the purpose of program 4 vehicle parameters (e.g., current speed, fuel level in tank), trip-related data from the navigation system (e.g., position, route), or environmental parameters (e.g., external temperature, brightness). As described, the vehicle data to which program 4 may have access must be established in program parts 41, identified as trusted by digital certificate 5.

Owing to the method of the invention, the possibilities for improper use by means of a man-in-the-middle attack are limited to the change in the display of fixed areas 43 for displaying the variable contents. In the presented example, the manipulation, e.g., of the title field, album cover art, or background color would be conceivable. However, the execution of uncertified functions (for instance, the execution of an entire different program) or the uncertified access to vehicle data is not possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for displaying information and operating a mobile device not assigned to a motor vehicle via an electronic unit in a motor vehicle, the motor vehicle electronic unit having a display and an operating device of a motor vehicle, the method comprising:
   storing, on the mobile device, a program executable on the mobile device, wherein the program comprises user interface program parts to provide a user interface for operating processes of the program, the user interface having fixed areas for displaying variable contents;
   storing, on the mobile device, a digital certificate, which is assigned to the user interface program parts;
   transmitting the user interface program parts, with the at least one certificate assigned to the program parts, from the mobile device to the electronic unit of the motor vehicle;
   receiving and storing the user interface program parts and the at least one certificate assigned to the program parts at the motor vehicle electronic unit;
   transmitting program data to the motor vehicle electronic unit from a vehicle bus and the mobile device;
   receiving and storing the program data at the motor vehicle electronic unit, wherein the user interface program parts in the motor vehicle electronic unit receive and process the program data received from the vehicle bus;
   verifying the user interface program parts received and stored in the motor vehicle electronic unit based on verification of validity of the transmitted at least one digital certificate in the motor vehicle electronic unit;
   establishing access to the program data by the user interface program parts in response to verification of the user interface program parts in the motor vehicle electronic unit;
   executing the user interface program parts transmitted from the mobile device in the motor vehicle electronic unit in response to verification of the user interface program parts in the motor vehicle electronic unit; and
   displaying, on the motor vehicle electronic unit display, the variable contents in the fixed areas of the user interface for operating processes of the program executable on the mobile device.

2. The method of claim 1, wherein the at least one digital certificate is issued beforehand by a certification server, wherein the at least one digital certificate is assigned to the user interface program parts for the operating processes of the program executable on the mobile device via the certification server.

3. The method of claim 2, wherein the certification server has at least one key pair comprising a private key and a public key, wherein the public key is used for verification of the user interface program parts using the at least one digital certificate in the motor vehicle electronic unit, wherein the public key is stored in the motor vehicle electronic unit or transmitted to the motor vehicle electronic unit from the certification server or some other trusted source over a secure data connection.

4. The method of claim 3, wherein the at least one digital certificate comprises a digital fingerprint, and wherein the digital fingerprint is created by the certification server using the private key and the user interface program parts for the operating processes of the program executable on the mobile device.

5. The method of claim 4, wherein the certification server issues the at least one digital certificate in accordance with the ITU-T standard X.509.

6. The method of claim 2, wherein the user interface program executable on the mobile device and the at least one digital certificate assigned to the user interface program parts are transmitted from the certification server.

7. The method of claim 1, wherein the variable contents for display in fixed areas of the user interface on the motor vehicle electronic unit display are transmitted to the motor vehicle electronic unit.

8. The method of claim 1, wherein the motor vehicle electronic unit is connected to at least one data bus system of the motor vehicle and the variable contents for display in fixed areas of the user interface on the motor vehicle electronic unit display are obtained from data received via the at least one data bus system.

9. The method of claim 8, the method further comprising:
   transmitting the data obtained from the at least one bus system from the motor vehicle electronic unit to the mobile device for processing by the program executable and stored on the mobile device; and
   transmitting the processed data from the mobile device to the electronic unit of the motor vehicle.

10. The method of claim 1, further comprising transmitting at least one command generated via the operating device of the motor vehicle electronic unit to the mobile device.

11. The method of claim 10, further comprising controlling the program executable on the mobile device as a function of the at least one command.

12. The method of claim 8, wherein the motor vehicle electronic unit receives data from a plurality of sensors in the motor vehicle via the vehicle data bus.

13. A method for displaying information and operating a mobile device not assigned to a motor vehicle via an electronic unit of a motor vehicle, the motor vehicle electronic unit having a display and an operating device, the method comprising:
   storing, on the mobile device, a program executable on the mobile device, wherein the program comprises a plurality of user interface program parts to provide a user interface for operating processes of the program, wherein the user interface has fixed areas for displaying variable contents;
   storing, on the mobile device, a digital certificate, which is assigned to the plurality of user interface program parts;
   transmitting user interface program data, at least one of the plurality of user interface program parts, and the digital certificate from the mobile device to the motor vehicle electronic unit;
   receiving and storing, at the motor vehicle electronic unit, the at least one of the plurality of user interface program parts and the digital certificate at the motor vehicle electronic unit;
   receiving and storing, at the motor vehicle electronic unit, the program data, wherein the user interface program parts in the motor vehicle electronic unit receive and process the program data received from a vehicle bus;
   verifying the at least one of the plurality of user interface program parts based on verification of validity of the transmitted digital certificate assigned to the plurality of user interface program parts in the motor vehicle electronic unit;
   executing the at least one of the plurality of user interface program parts transmitted from the mobile device in the motor vehicle electronic unit in response to verification of the validity of the digital certificate;

establishing ongoing access to the program data by the at least one of the plurality of user interface program parts stored in the motor vehicle electronic unit in response to the verification of the validity of the digital certificate;

executing the at least one of the plurality of program parts in the motor vehicle electronic unit; and displaying the variable contents in fixed areas of the user interface for operating processes of the program executable on the mobile device as a result of executing the at least one of the plurality of program parts.

14. The method of claim 1, wherein the user interface is unchangeable.

15. The method of claim 1, further comprising transmitting the program data received from the vehicle bus to the mobile device, and receiving transformed program data from the mobile device at the electronic unit.

16. The method of claim 13, wherein the verifying of the at least one of the plurality of user interface program parts based on the transmitted digital certificate assigned to the plurality of user interface program parts in the motor vehicle electronic unit results in at least one verified user interface program part that restricts access to program data from the vehicle bus of the motor vehicle.

* * * * *